May 26, 1970  S. V. GENETTI  3,513,892
AUTOMATIC FOOD DICER
Filed June 21, 1968

INVENTOR
STANLEY V. GENETTI
BY Beale and Jones
ATTORNEYS 3,513,892
AUTOMATIC FOOD DICER
Stanley V. Genetti, 100 S. Vine St.,
Hazleton, Pa. 18201
Filed June 21, 1968, Ser. No. 738,974
Int. Cl. B26d 3/26
U.S. Cl. 146—78
9 Claims

ABSTRACT OF THE DISCLOSURE

A food dicer is disclosed which comprises two sets of stationary cutters, the blades or cutting wires of one set being perpendicular to the blades of the other set, and two reciprocating plungers arranged to force the food to be diced first through one set of blades then through the second set. The first set is arranged vertically to form the end wall of a feed bin, and its corresponding plunger swings through the bin to force the food horizontally through this first set of blades. The food passing through the first blades falls onto a horizontally arranged second set of blades and the second plunger, traveling vertically, thereafter forces the material down through the second blades into a collecting bin, completing the dicing operation. The second plunger is driven reciprocally in its vertical path by an electric motor and crank linkage, while the first plunger is driven by the motion of the second plunger through the medium of a cam arm which rides on the second plunger.

BACKGROUND OF THE INVENTION

The present invention relates, in general, to food processing machinery, and in particular to an automatic power driven dicing machine for cutting, slicing, chopping or dicing any fruit, vegetable, meat or other food without the requirement for hand operation or constant attendance while operating.

Numerous cutting and dicing devices for various types of foods are well known to the prior art. However, most such devices have been hand operated and have required individual feed before each cutting operation. Such devices are generally designed for home use or the like, and are slow-operating, tedious to use and time consuming. Because they require individual feeding of the items to be cut, they are dangerous and often result in pinched or cut fingers. Further, the mechanisms require to operate these devices involve complex linkages which produce awkward motions that make such devices difficult to operate. Such machines are very tiring to the operator where any appreciable amount of cutting or dicing is to be done.

Power driven cutters and dicers have been developed, but such devices are not suitable for the majority of users since they tend to be complex mechanisms which increase the fabricating and maintenance costs to the point where their use is not warranted in relatively small operations. Thus, such devices are not practical for home, restaurant or small food store operations.

SUMMARY OF THE INVENTION

It is, therefore, an object of the present invention to provide a power driven dicer for various kinds of foods which improves on the efficiency and safety of prior devices while remaining relatively simple and thus easy to make and maintain.

A further object of the invention is to provide a food dicer having two sequential cutting actions wherein a first plunger is motor driven and a second plunger is driven by the first plunger through the medium of a cam arm riding on the first plunger. An automatic feed bin is provided, as is a container for the diced foods, whereby the machine can operate unattended, thus relieving the operator of the tedium of operating the machine and reducing the time he must spend in dicing foods.

The present invention provides a vertically driven plunger and a horizontally driven plunger, each associated with respective horizontal and vertically aligned cutters, or blade holders. The plungers are synchronized so that first one and then the other plunger operates to press the food to be diced through the cutters. The vertically moving plunger is driven through a crank and lever arm mechanism by means of an electric motor, while the horizontally moving plunger is driven by a cam follower arm which rides on the first plunger. The horizontal plunger acts as a feed mechanism for pressing material from a feed bin through the vertical cutter to slice the food in one direction (i.e., longitudinally). The food falls onto the horizontal cutter and the vertical plunger moves downwardly to press the sliced material through the blades of the horizontal cutter, cutting the food transversely, and thus completing the dicing operation.

BRIEF DESCRIPTION OF THE DRAWINGS

The foregoing and additional objects, features and advantages of the present invention will be more fully appreciated when considered in the light of the following specification, taken with the accompanying drawings, in which.

DESCRIPTION OF A PREFERRED EMBODIMENT

Figure 1:
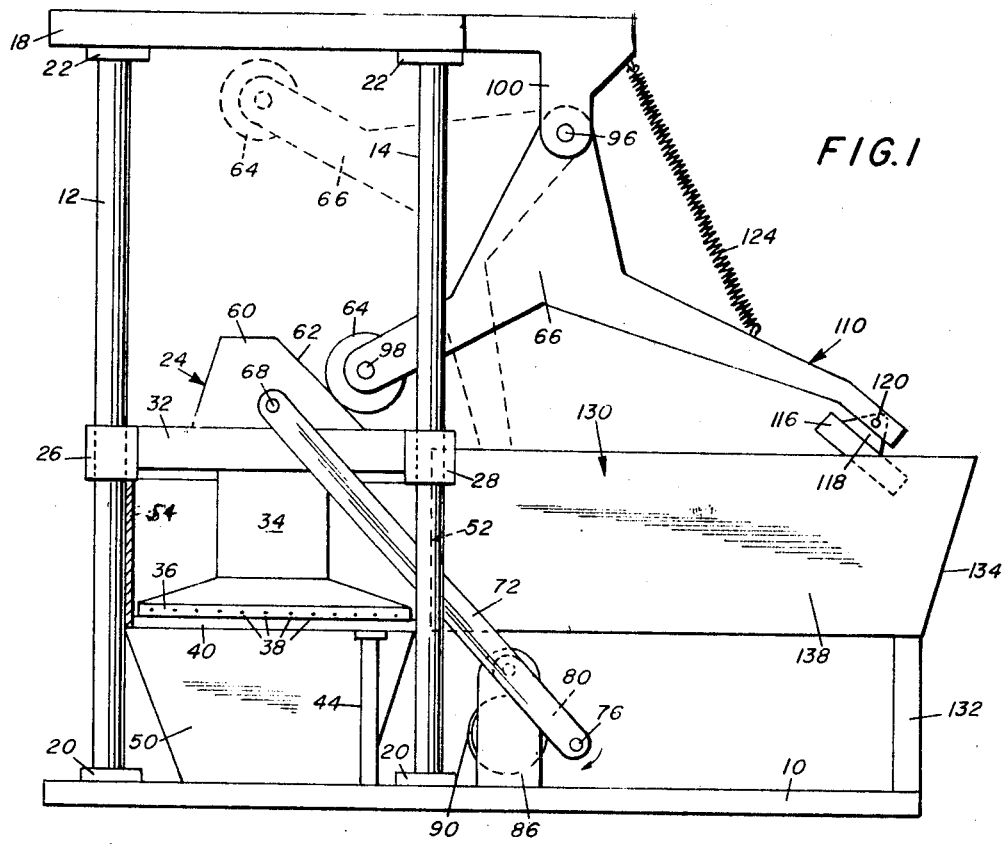
FIG. 1 is a side view of a dicer mechanism made in accordance with the present invention.

Turning now to a consideration of the drawings, there is illustrated in the figures at 10 a base plate which serves as a support for the dicing mechanism of the present invention. The base plate carries four vertical support columns, of which three columns 12, 14 and 16 are visible in the drawings. A top plate 18 is carried by the support columns 12, 14 and 16. The support columns may be threaded into the base and top plates, as at threaded sockets 20 and 22 shown for column 12 or may be welded to the plates or otherwise suitably fastened.

The support columns provide a runway, or track, for a vertically slidable plunger 24 which is mounted on the support columns by means of four journal or bearing members surrounding their corresponding posts. These bearing members are illustrated in the figures at 26, 28 and 30, riding on posts 12, 14, and 16, respectively. The plunger is located within the four support columns, with the bearing members being carried by a frame portion 32. Depending from frame portion 32 is a plunger head, or press plate, 34 which serves to drive the food to be cut through a horizontally disposed cutter frame 36. As illustrated in FIG. 1, plunger 24 in its lowermost position drives the plunger head 34 down to the frame 36, the cutters of which extend horizontally in a direction perpendicular to the plane of the drawing in the illustrated embodiment. The cutters for the frame 36 are indicated at 38 as being cutting wires; however, it will be apparent that suitable blades or the like may be substituted therefor. The frame 36 may be supported on a cutter platform 40 mounted in any suitable manner within the area defined by the four support columns. For example, platform 40 may be attached to the rear post 12 and its corresponding rear post 12' (not shown) by means of brackets 42 or the like (FIG. 2), while the front edge of the platform may be supported by support posts 44 and 46 mounted on the base plate 10. This arrangement permits the platform to be tapered from the rear brackets to the front posts, providing space for the driving mechanism to be described. The brackets 42 and the support posts 44 and 46 hold the cutter platform level so that the cutter frame 36 will be in proper position for the dicing operation. The cutter frame fits over an opening in the cutter platform 40, whereby food passing through the cutter frame may fall downwardly into a container 50. Container 50 rests on the base plate 10 and preferably is slidable into position under the cutter platform 40 to receive the diced food.

Cutter platform 40, together with the cutter frame 36, forms the bottom of a cutting chamber 52 in which the vertically moving plunger head 34 is disposed. This chamber includes a back wall 54 and side walls 56 and 58, and serves to receive sliced food as it passes through the vertically disposed cutter to be described. FIG. 1 illustrates chamber 52 with the side wall 56 removed in order to more clearly show the cutter frame 36.

Figure 2:
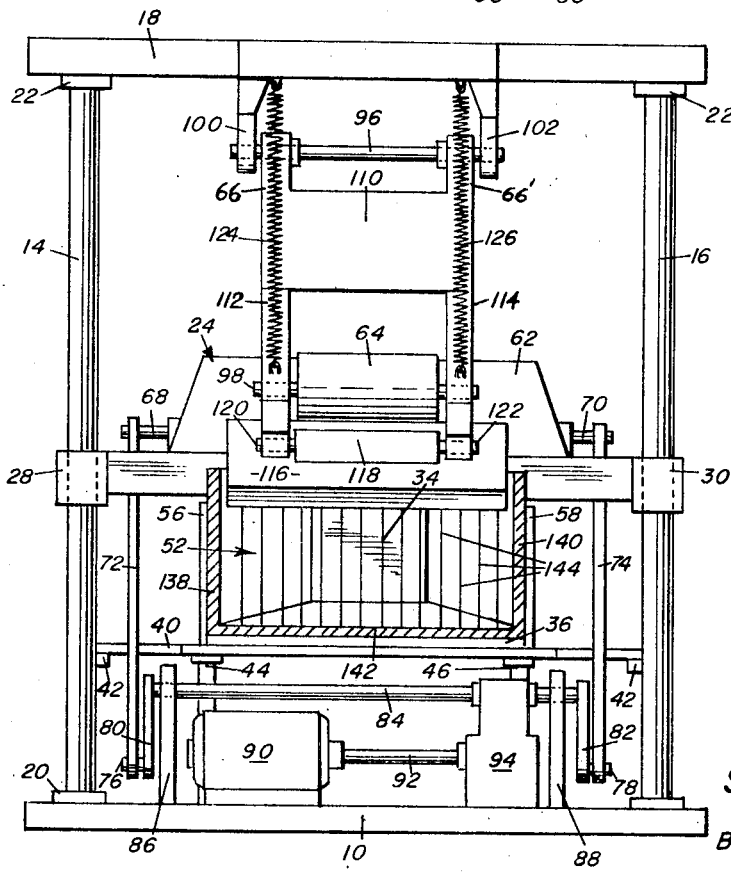
FIG. 2 is an end view of the dicer of FIG. 1.

The vertical plunger 24 includes an upper portion 60 having a cam face, or surface, 62 adapted to receive a cam follower roller 64 and cam follower arm 66, to be described. The upper portion 60 also carries a pair of drive pins 68 and 70 to which are connected the main drive lever arms 72 and 74, respectively. These main lever arms extend between the drive pins and corresponding cam lugs 76 and 78. These lugs are mounted on corresponding drive arms, or cranks, 80 and 82 which are fixed to a main drive shaft 84 extending across the machine, as illustrated in FIG. 2. The drive shaft is journalled in suitable supports 86 and 88 carried by the base plate 10 and is driven by an electric motor 90 by way of motor shaft 92 and a gear reduction mechanism 94. Rotation of drive shaft 84 by motor 90 causes the drive arms 80 and 82, which may be keyed onto the shaft 84 or otherwise affixed for rotation therewith, to rotate and to drive the lever arms 72 and 74. This motion causes the vertical plunger 24 to be driven upwardly toward top plate 18, sliding on the vertical support columns, and to return to the position shown, once for each rotation of the main drive shaft 84, whereby a single rotation of the drive shaft comprises a cycle of operation for the dicer machine.

The vertical motion of plunger 24 is translated by cam face 62 through the shaft 98 on which cam follower roller 64 is mounted to cam follower arm 66, causing the follower arm to rotate in a clockwise direction about its mounting shaft 96, as viewed in FIG. 1. As will be seen in FIG. 2, the mounting shaft is carried by depending brackets 100 and 102, which are supported by the top plate 18, and passes through the cam arm 66. This cam arm may be made up of a pair of cam follower arms 66 and 66', or may be a single follower arm. Affixed to the cam follower is a horizontally moving plunger 110 which includes a pair of side arms 112 and 114. These arms carry at their outermost end a plunger head, or press plate, 116. The horizontal press plate may be mounted on the horizontal plunger by any suitable means, as by a mounting block 118 connected to the arms 112 and 114 by connector pins 120 and 122. The plunger head may be fixedly mounted on the ends of the plunger or may be mounted for slight rotational movement so that it may adjust itself to the material to be pressed through the vertical cutting means. The horizontal plunger is biased to the upward position illustrated in the figures by means of coil springs 124 and 126 extending between the top plate 18 and arms 112 and 114, respectively. Although coil springs have been illustrated, it will be apparent that other methods of biasing this plunger may be used.

Plunger 110 is adapted to move in a feed bin 130 which is adapted to hold the material which is to be diced by the machine. The feed bin may be supported at its inner end by the cutter platform 40, and is supported at its outer end by support posts 132, shown in FIG. 1. FIG. 2 shows the bin 130 in cross section with the end portion 134 removed, better to illustrate the vertically aligned cutter frame 136, which forms the end of bin 130 opposite to end 134. As shown in FIG. 2, bin 130 is comprised of side walls 138 and 140 and bottom wall 142. The vertical cutter frame 136 carries a plurality of cutting wires, blades or the like 144, which are illustrated as being vertically disposed. These cutters are designed to cut the material longitudinally in the first step of the dicing operation, and thus it may be desirable to arrange them differently to provide various cutting patterns and shapes.

The operation of the dicing machine of the present invention may be explained as follows. With the device in the rest position illustrated in the figures, the fruit, vegetables, meat or other material to be diced is placed in the feed bin 130, and the machine is then activated by turning on drive motor 90. Rotation of the motor rotates drive shaft 84, causing lever arms 72 and 74 to raise the vertically moving plunger 24. As the plunger 24 moves upwardly, it exerts an upward force on roller 64 and its shaft 100 which are carried by cam follower arms 66 and 66'. This causes the cam follower arm to pivot about its mounting shaft 96 in a clockwise direction as viewed in FIG. 1. As will be seen from the figure, this will tend to carry shaft 100 upwardly and toward the center of plunger 24, and to accommodate this tendency the roller 64 rolls upwardly on cam face 62. By the time the vertically moving plunger 24 reaches the top of its motion, roller 64 will be resting on the top surface of portion 60 of the plunger. This camming action causes greater motion in the cam follower arm 66 than would be imparted by the vertical distance traveled by plunger 24.

As the cam follower arms 66 and 66' are moved upwardly with plunger 24, the horizontally moving plunger 110 sweeps through bin 130 toward the end of the bin defined by the vertically aligned cutter frame 136, carrying with it material from within the bin to be pressed through the cutters carried by frame 136. Upon completion of the upward motion of plunger 24, the horizontal press plate 116 is in a position directly adjacent the cutting wires 144, as shown in dotted lines in FIG. 1, thereby causing the material moved by the plunger to be pressed completely through the cutting blades into the vertical cutting chamber 52, which has been vacated by the plunger 24. The sliced material is now lying on the horizontally aligned cutting blades or wires 38 which are disposed in a direction perpendicular to the cutting blades or wires 144.

As the main shaft 84 continues to rotate, the lever arms 72 and 74 begin to draw plunger 24 downwardly. The plunger head or vertical press plate 34 is driven down into the vertical cutting chamber 52 and presses the already longitudinally sliced material through the horizontally disposed cutters 38 for reception by the container 50. When the drive shaft 84 has completed a single revolution, the plunger 24 will have been returned to the position shown in FIG. 1 and all of the material in chamber 52 will have been pressed through cutters 38 and into the container. Continued rotation of shaft 84 will repeat the cycle of operation with the horizontally moving and vertically moving plungers alternately forcing the material to be diced through their corresponding cutters. The bias springs 124 and 126 insure that the horizontal plunger 110 will return to the position of FIG. 1 at the end of each cycle.

Thus, there has been provided an automatic dicing machine which serves to automatically slice and then dice material by means of synchronized vertically and horizontally moving plungers. The vertically moving plunger is driven by a motor, while the horizontally moving plunger is driven by a cam follower arm which rides on a cam surface of the vertically moving plunger. This mechanism provides an automatic feed operation from a suitable bin 130 and thus a dicing operation which is simple, safe and effective. Although a preferred embodiment of the invention has been illustrated, it will be apparent to those skilled in the art that various changes and modifications may be made in the structure without departing from the scope of the invention. For example, the feed bin is merely a diagrammatic illustration and may vary considerably in shape and size. It may be provided with a sloping bottom to increase the flow of material to the cutter mechanism. Similarly, the exact arrangement and pattern of the cutter blades, the particular shape of the cam follower arms and the exact locations of the crank and lever mechanism are matters of design within the skill of the art. Therefore, it is desired that the foregoing description be taken as illustrative, and limited only by the following claims.

I claim:

1. In an automatic food dicer mechanism, a first, driven plunger arranged to press material to be diced through a first cutting means, a second, driven plunger arranged to press said material through a second cutting means, said second plunger including a cam face, means for driving said second plunger in a reciprocating path; and cam follower means in contact with said cam face responsive to the motion of said second plunger to drive said first plunger in a reciprocating path.

2. The food dicer of claim 1, further including feed means for supplying said material to be diced to said first plunger for cutting in a longitudinal direction, said second plunger thereafter pressing said material through said second cutting means for cutting in a transverse direction.

3. The food dicer of claim 1, wherein said means for driving said second plunger includes electric motor means connected to said second plunger through a crank and lever arm arrangement.

4. The food dicer of claim 3, further including track means for guiding said second plunger in a predetermined path.

5. The food dicer of claim 4, wherein said cam face forms one surface of said second plunger, and said cam follower means includes a follower arm pivotally mounted at a point remote from said cam face, said first plunger being carried by said follower arm.

6. The food dicer of claim 5, wherein said first plunger further includes first press plate means for pressing said material to be diced through said first cutting means for cutting in a longitudinal direction, and said second plunger further includes second press plate means for thereafter pressing said material to be diced through said second cutting means for cutting in a transverse direction, said first and second plungers moving in their corresponding reciprocating paths in synchronism, whereby one plunger is moving toward its corresponding cutting means when the other plunger is moving away from its corresponding cutting means.

7. The food dicer of claim 6, wherein said first plunger moves in a substantially horizontal path toward and away from said first cutting means and said second plunger moves in a substantially vertical path away from and toward said second cutting means, said cam face comprising the upper surface of said second plunger.

8. The food dicer of claim 6, wherein said track means comprises at least two support columns, said second plunger including journal means surrounding each column, whereby said journal means carry said second plunger along the path defined by said support columns.

9. The food dicer of claim 8, wherein said means for driving said second plunger further includes a main drive shaft driven by said electric motor, crank means fixed to said main drive shaft for rotation therewith, and cam lug means connecting said crank to one end of said lever arm, the other end of said lever arm being connected to said second plunger, whereby rotary motion of said main drive shaft reciprocates said second plunger along said path defined by said support columns.

References Cited

UNITED STATES PATENTS

| | | | |
|---|---|---|---|
| 2,303,595 | 12/1942 | Young | 146—78 |
| 2,853,109 | 9/1958 | Norton | 146—78 |
| 3,327,751 | 6/1967 | Lamb | 146—78 |

FOREIGN PATENTS 534,320   3/1941   Great Britain.

ANDREW R. JUHASZ, Primary Examiner

Z. R. BILINSKY, Assistant Examiner

U.S. Cl. X.R.

74—107